United States Patent
Jeong

Patent Number: 6,011,658
Date of Patent: Jan. 4, 2000

[54] COMPACT ZOOM LENS SYSTEM

[75] Inventor: Jin-Myoung Jeong, Kyeongsangnam-do, Rep. of Korea

[73] Assignee: Samsung Aerospace Industries, Ltd., Rep. of Korea

[21] Appl. No.: 09/133,568

[22] Filed: Aug. 13, 1998

[30]  Foreign Application Priority Data

Aug. 14, 1997 [KR] Rep. of Korea ...................... 97-38855

[51] Int. Cl.[7] .................................................. G02B 15/14
[52] U.S. Cl. ............................................................. 359/692
[58] Field of Search .................................. 359/692, 690, 359/687

[56]  References Cited

U.S. PATENT DOCUMENTS

| | | |
|---|---|---|
| 5,381,270 | 1/1995 | Cho . |
| 5,796,527 | 8/1998 | Ohtake ..................................... 359/692 |
| 5,844,725 | 12/1998 | Itoh ......................................... 359/692 |

FOREIGN PATENT DOCUMENTS

| | | |
|---|---|---|
| 2-284109 | 11/1990 | Japan . |
| 7-120673 | 5/1995 | Japan . |

*Primary Examiner*—Georgia Epps
*Assistant Examiner*—Timothy J Thompson
*Attorney, Agent, or Firm*—Fish & Richardson P.C.

[57]  ABSTRACT

A compact zoom lens system is described which includes, when viewed from an object, a first lens group with a positive refractive power; a second lens group with a negative refractive power; wherein the magnification change of the lens system can be changed by moving the first lens group and the second lens group along the optical axis of the lens system towards the object, wherein $0.45 < L_w/f_t < 0.55$, $2.5 < f_t/f_w$ ($\phi$m) $< 3.0$, $4.3 < m2t < 5$. $L_w$ is the distance between the front surface which is the surface facing the object of the first lens of the first lens group, and the image plane in the wide angle position, $f_t$ is the focal length of the lens system in the telephoto position, $f_w$ is the focal length of the lens system in the wide angle position, $\phi$m is the zoom ratio, and m2t is the magnification of the second lens group in the telephoto position.

6 Claims, 7 Drawing Sheets

Spherical Aberration

Astigmatism

Distortion

Spherical Aberration

Astigmatism

Distortion

COMPACT ZOOM LENS SYSTEM

BACKGROUND OF THE INVENTION (a) Field of the Invention

The present invention relates to a zoom lens system, more particularly to a zoom lens system having a high magnification, a compact size and low aberration.

(b) Description of the Related Art

For a lens shutter camera or video camera to be compact, the zoom lens system must be designed to be compact and as short as possible.

The zoom lens system for a lens shutter camera can generally be classified into two types. A first type has two lens groups, whereas a second type has three lens groups. A compact zoom lens system generally uses the second type with three lens groups. However, compact zoom lens systems for cameras with zoom lens systems with a zoom ratio of greater than 2.0 are rather long and therefore difficult to manufacture.

The lenses installed in zoom lens systems are generally spherical lenses, with the number of lenses increasing considerably in lens systems with a high zoom ratio. The total length of the zoom lens system then increases accordingly which makes it difficult to manufacture such zoom lens system in a compact form.

A conventional compact zoom system with two lens groups is described, for example, in Japanese Laid-Open Patent Application No. Hei 2-284109, Japanese Laid-Open Patent Application No. Hei 7-120673, and U.S. Pat. No. 5,381,270 Japanese Laid-Open Patent Application No. Hei 2-284109 and Japanese Laid-Open Patent Application No. Hei 7-120673 describe zoom systems with zoom ratios of 2.0 and as many as eight lenses. Zoom lens systems of this type are difficult to manufacture in compact form. The zoom lens system described in U.S. Pat. No. 5,381,270 also has eight lenses and a zoom ratio of 2.0. Moreover, the total length of the zoom lens system of U.S. Pat. No. 5,381,270 exceeds 30 mm. It is therefore quite difficult to manufacture compact zoom lens systems.

SUMMARY OF THE INVENTION

With the foregoing in mind, it is an object of the present invention to provide a compact zoom lens system which has a zoom ratio of 2.8 and a small size.

It is another object of the present invention to provide a compact zoom lens system with a low aberration.

The objects of the invention are met by a compact zoom lens system which includes when viewed in the direction from an object to the image plane, a first lens group with a positive refractive power; and a second lens group with a negative refractive power, wherein the magnification of the system is changed by moving the first lens group and the second lens group along the optical axis towards the object, and wherein $0.45 < L_w/f_t < 0.55$, $2.5 < f_t/f_w(\phi m) < 3.0$, $4.3 < m2t < 5$, $L_w$ is here the distance between the first lens surface which is the surface facing the object of the first lens of the first lens group and the image plane in the wide angle position, $f_t$ is a focal length of the compact zoom lens system in the telephoto position, $f_w$ is a focal length of the compact zoom lens system in the wide angle position, $\phi m$ is the zoom ratio, and m2t is the magnification of the second lens group in the telephoto position.

BRIEF DESCRIPTION OF THE DRAWINGS

The above objects and features of the present invention will be apparent from the following description of the preferred embodiments with reference to the accompanying drawings.

FIGS. 6A to 4C illustrate the aberrations of a compact zoom lens system in the wide angle position in accordance with a third preferred embodiment of the present invention;

DETAILED DESCRIPTION OF THE PREFERRED EMBODIMENTS

Reference will now be made in detail to preferred embodiments of the present invention, examples of which are illustrated in the accompanying drawing.

Figures 1A, 1B:
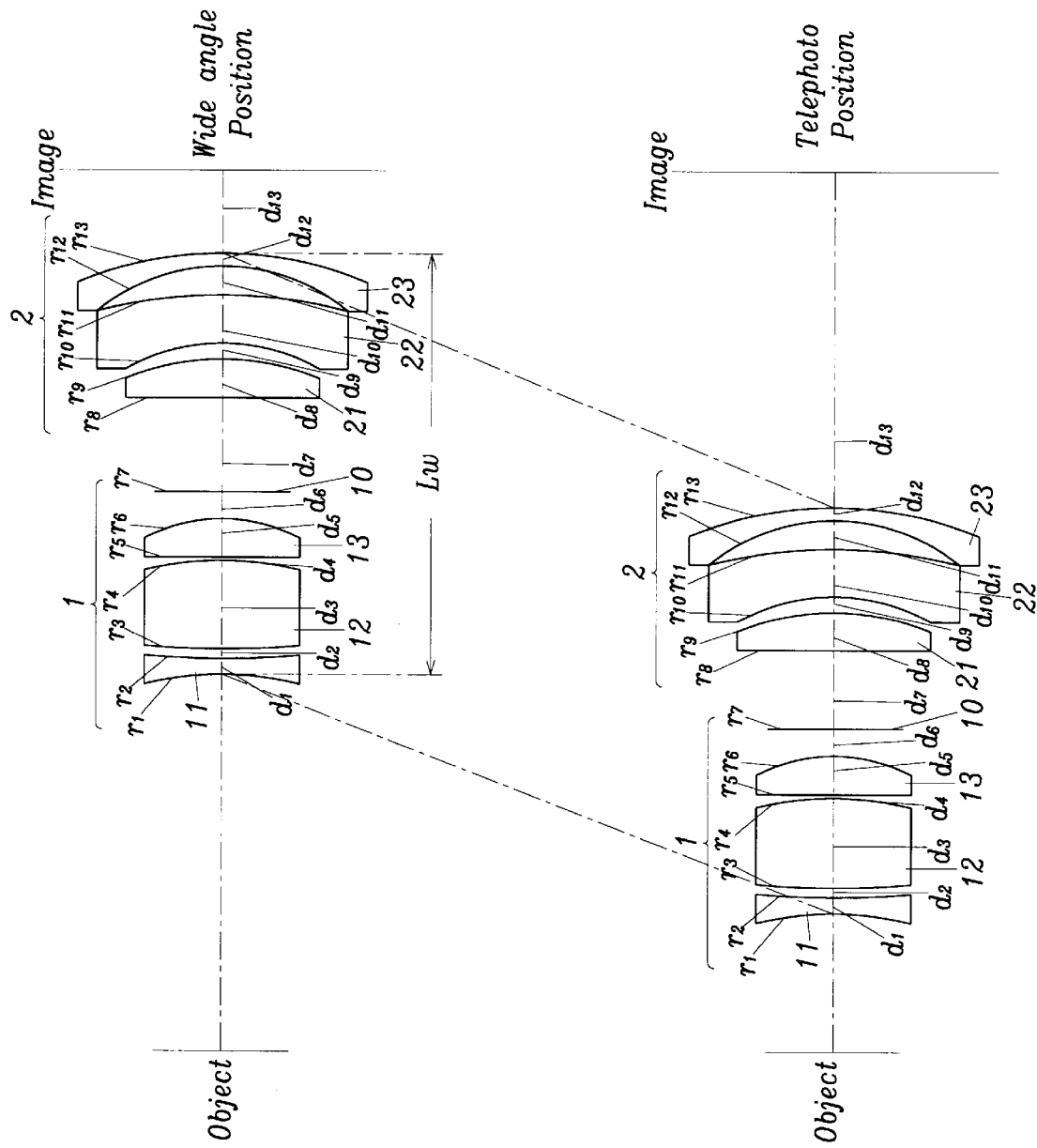
FIG. 1A is a side view illustrating a compact zoom lens system at a wide angle position in accordance with a preferred embodiment of the present invention.
FIG. 1B is a side view illustrating the compact zoom lens system at a telephoto position in accordance with the preferred embodiment of FIG. 1A.
Figure 2A:
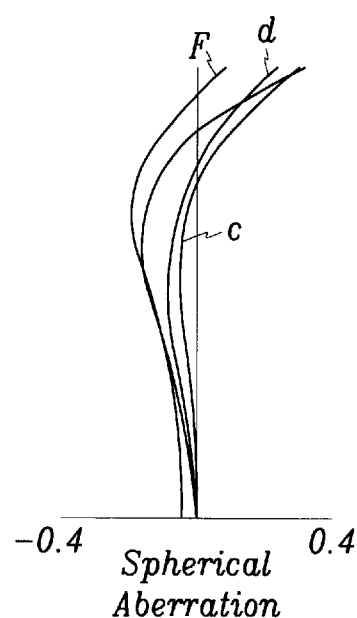
FIGS. 2A to 2C illustrate the aberrations of a compact zoom lens system in the wide angle position in accordance with a first preferred embodiment of the present invention.
Figure 2B:
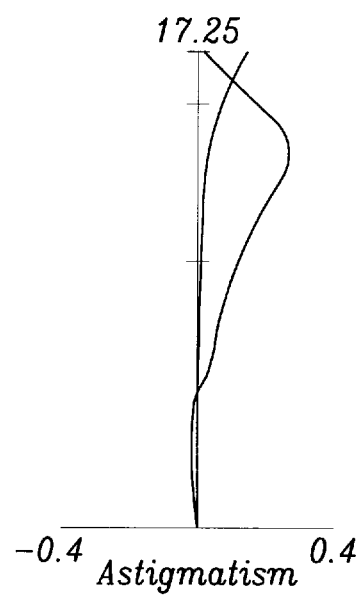
Figure 2C:
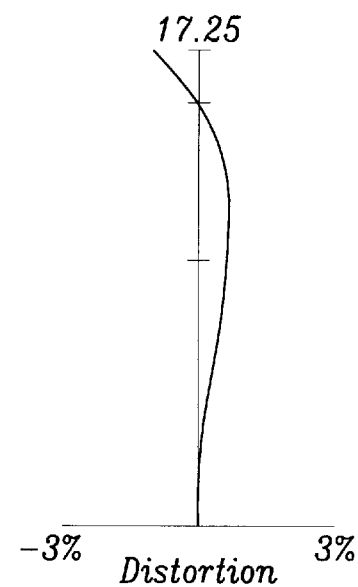
Figure 3A:
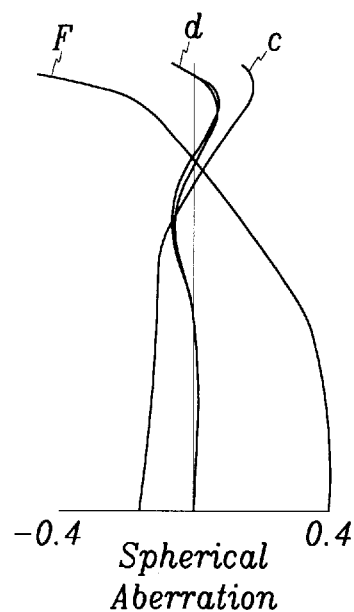
FIGS. 3A to 3C illustrate the aberrations of a compact zoom lens system in the telephoto position in accordance with the first preferred embodiment of the present invention.
Figure 3B:
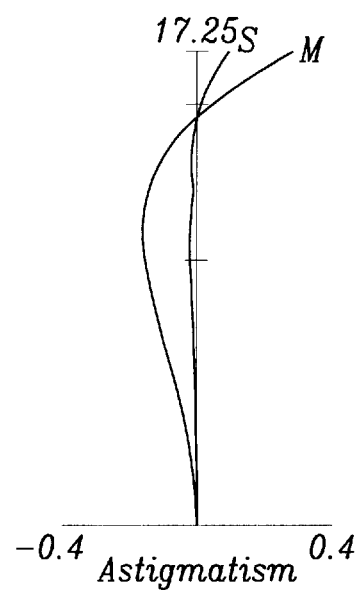
Figure 3C:
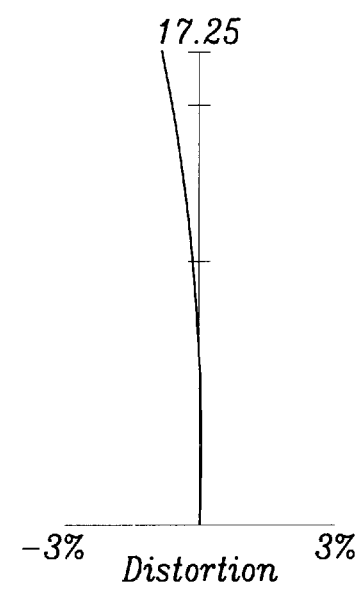
Figure 4A:
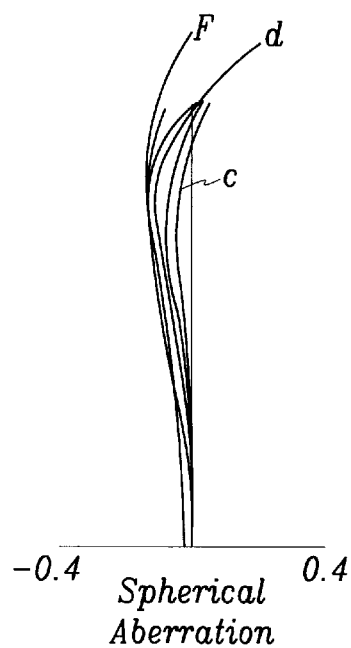
FIGS. 4A to 4C illustrate the aberrations of a compact zoom lens system in the wide angle position in accordance with a second preferred embodiment of the present invention.
Figure 4B:
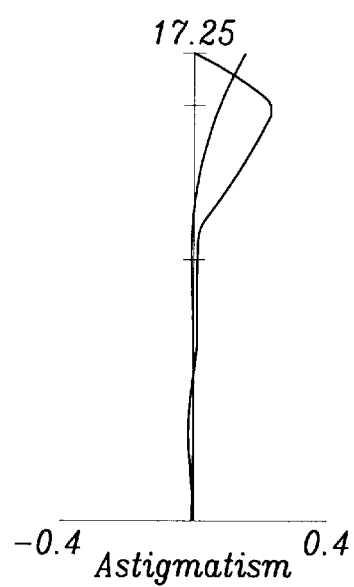
Figure 4C:
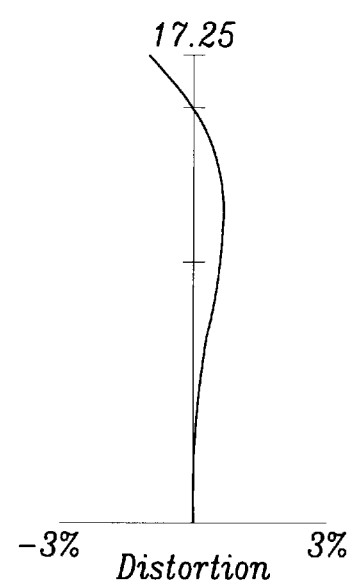
Figure 5A:
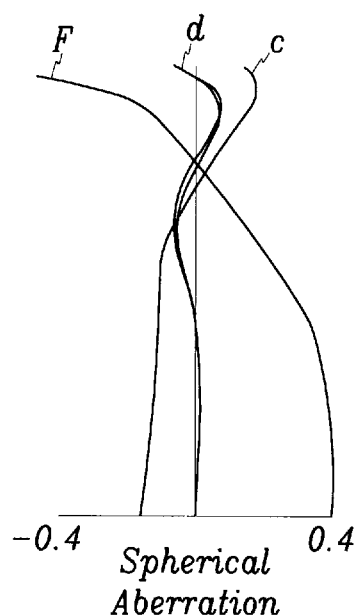
FIGS. 5A to 5C illustrate the aberrations of a compact zoom lens system in the telephoto position in accordance with the second preferred embodiment of the present invention.
Figure 5B:
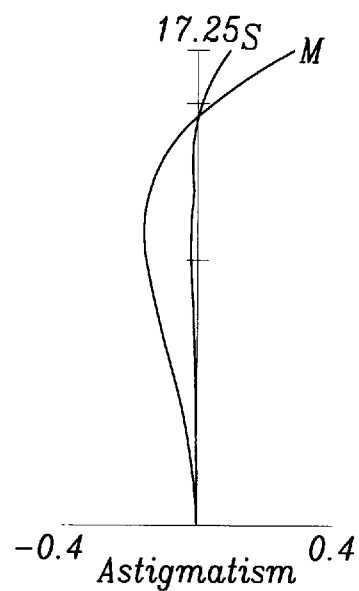
Figure 5C:
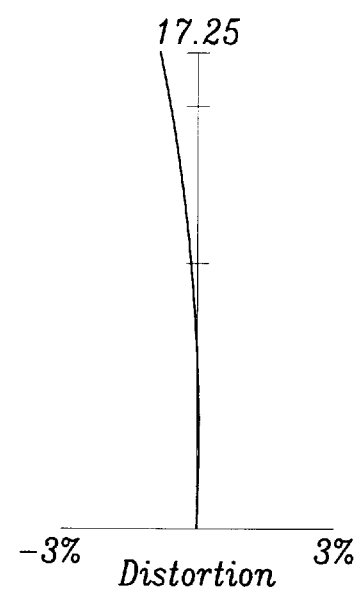
Figure 6A:
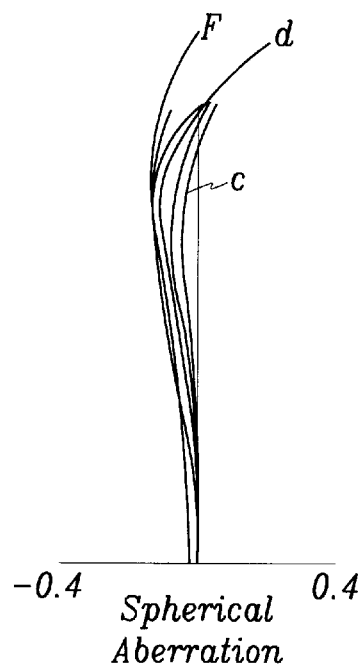
Figure 6B:
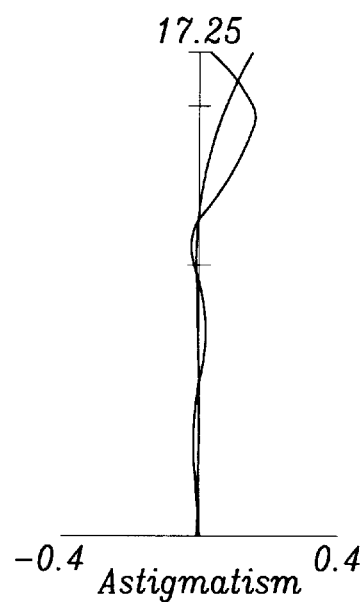
Figure 6C:
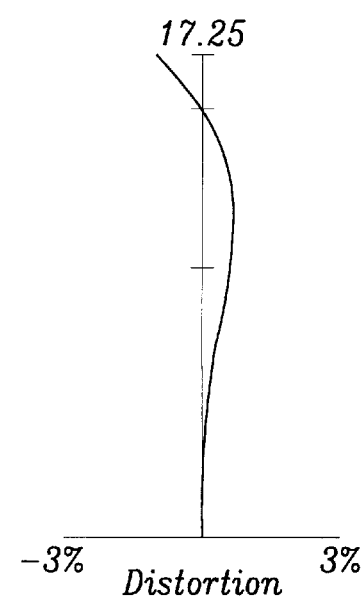
Figure 7A:
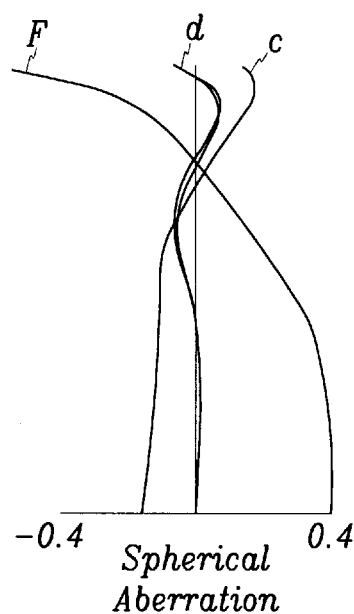
FIGS. 7A to 7C are views illustrating aberrations of a compact zoom lens system in the telephoto position in accordance with the third preferred embodiment of the present invention.
Figure 7B:
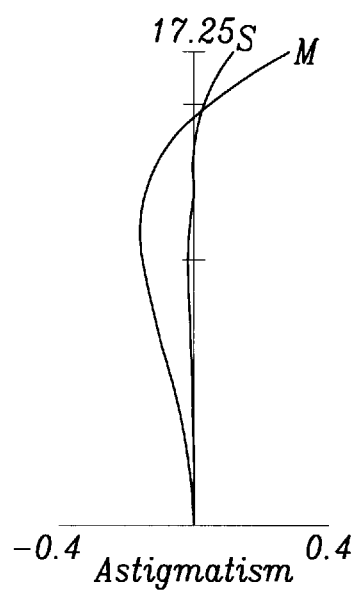
Figure 7C:
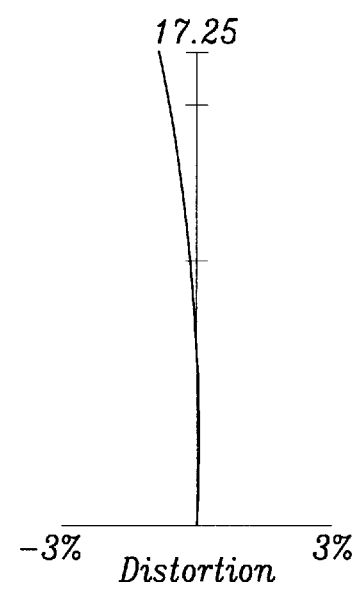

Referring first to FIGS. 1A to 1B, the compact zoom lens system in accordance with a preferred embodiment of the present invention includes, when viewed from the object side of the lens system, a first lens group 1 with a positive refractive power, a second lens group 2 with a negative refractive power, and an aperture 10.

The first lens group 1 has a concave lens having a concave surface facing the object and a negative refractive power, and at least one convex lens having a convex surface facing the object and a positive refractive power.

More specifically, the first lens group 1 has a first lens 11 with a negative refractive power with the concave surface facing the object, a second lens 12 with a positive refractive power which is biconvex, and a third lens 13 with a positive refractive power and a convex surface facing the image plane.

The second lens group 2 has a first lens 21 which has a convex surface facing the image plane and a positive refractive power, a second lens 22 which has a concave surface facing the object and a negative refractive power, and a third lens 23 which has a concave surface facing the object and a negative refractive power.

The second lens 22 and the third lens 23 are meniscus lenses.

An aperture 10 is located between the first lens group 1 and the second lens group 2 and is closer to the third lens 13 of the first lens group 1.

The compact zoom lens system of the present invention operates as follows:

When the magnification of the lens system is changed, the first lens group 1 and the second lens group 2 move together along the optical axis towards the object, wherein the separation between the first lens group 1 and the second lens group 2 changes.

The compact zoom lens system in accordance with a preferred embodiment of the present invention satisfies the following conditions:

$$0.45 < L_w/f_t < 0.55 \quad (1)$$

$$2.5 < f_t/f_w(\phi m) < 3.0 \quad (2)$$

$$4.3 < m2t < 5 \quad (3)$$

wherein $L_w$ is the distance between the lens surface which is closest to the object, of the first lens 11 and the image plane at the wide angle position, $f_t$ is a focal length of the compact zoom lens system in the telephoto position, $f_w$ is a focal length of the compact zoom lens system in the wide angle position, $\phi m$ is the zoom ratio, and m2t is the magnification of the second lens group 2 in the telephoto position.

The condition (1) above determines the total length of the first lens group 1 as a function of the focal length of the zoom lens system in the telephoto position and is important for reducing the size of the compact zoom lens system.

It is difficult to reduce the size of the zoom lens system if the focal length $f_t$ of the compact zoom lens system in the telephoto position and the distance $L_w$ between the surface closest to the image plane of the first lens 11 and the image plane in the wide angle position become too large. Conversely, if the focal length $f_t$ and the distance $L_w$ become too short, then the lenses are difficult to manufacture and the system becomes very sensitive to the lens properties. Moreover, aberrations are more difficult to compensate.

The condition (2) relates to the zoom ratio of about 2.8.

If $f_t/f_w$ ($\phi m$) exceeds the upper limit of condition (2) while the total length of the zoom lens system remains fixed, then the optical power of the respective lens groups increases, making the lenses more difficult to manufacture. It is also more difficult to reduce the size of the zoom lens system.

If $f_t/f_w$ ($\phi m$) is less than the lower limit of condition (2), then the zoom lens system has to have a long focal length in the wide angle position or a short focal length in the telephoto position. The optical performance of the zoom lens system deteriorates because the first lens group 1 and the second lens group 2 have different optical powers.

The condition (3) is related to the zoom ratio of the second lens group 2 in the telephoto position.

If m2t exceeds the upper limit of condition 3, then the refractive power becomes very high, making the lenses more difficult to manufacture. The lens system also becomes very sensitive to the optical properties of the lenses.

If m2t is less than the lower limit of condition 3, then the aberrations are low. However, the zoom lens system is rather long and therefore not very compacting to condition 3, the size of the zoom lens system can be reduced by selecting a e magnification of the second lens group 2.

The data for the preferred embodiments of the present invention are shown in following Tables. In the Tables, r is the radius of curvature of a specified lens, d is the distance between lenses or the thickness of the lens, nd is the refractive index of the lense for d-line, and v is the Abbe number of the lens. The units of measurement in all tables are millimeters.

The data for the first embodiment of the present invention are listed in Table 1. In this embodiment, the focal length ranges from 22.6 mm to 59.88 mm, and the F number ranges from 4.6 to 10.84.

TABLE 1

| Surface No. | Radius of Curvature(r) (mm) | Distance(d) (mm) | Refractive Index(nd) | Abbe Number(v) |
|---|---|---|---|---|
| 1 | −13.089 | 0.95 | 1.8061 | 40.73 |
| 2 | 45.822 | 0.35 | 1 | 0 |
| 3 | 21.765 | 4.18 | 1.58913 | 61.25 |
| 4 | −18.995 | 0.10 | 1 | 0 |
| 5 | 41.678 | 2.10 | 1.497 | 81.61 |
| 6 | −7.839 | 1.30 | | |
| 7 | Aperture | 5.69–1.3 | 1 | 0 |
| 8 | −27.376 | 1.94 | 1.58547 | 34.39 |
| 9 | −8.762 | 0.94 | | |
| 10 | −7.481 | 2.34 | 1.834 | 37.34 |
| 11 | −22.084 | 1.87 | | |
| 12 | −8.203 | 0.85 | 1.757 | 47.71 |
| 13 | −21.183 | 6.77–41.23 | | |

The data for the second preferred embodiment of the present invention are listed table 2. In this embodiment, the focal length ranges from 22.6 mm to 61.9 mm, and the F number ranges from 4.6 to 11.2.

TABLE 2

| Surface No. | Radius of Curvature(r) (mm) | Distance(d) (mm) | Refractive Index(nd) | Abbe Number(v) |
|---|---|---|---|---|
| 1 | −13.25 | 0.85 | 1.8061 | 40.73 |
| 2 | 45.23 | 0.43 | 1 | 0 |
| 3 | 21.54 | 4.23 | 1.58913 | 61.25 |
| 4 | −18.99 | 0.1 | 1 | 0 |
| 5 | 42.09 | 2.09 | 1.497 | 81.61 |
| 6 | −7.88 | 1.3 | 1 | 0 |
| 7 | Aperture | 5.72–1.3 | 1 | 0 |
| 8 | −24.74 | 1.87 | 1.58547 | 34.39 |
| 9 | −8.88 | 1.00 | 1 | |
| 10 | −7.38 | 2.33 | 1.834 | 37.34 |
| 11 | −20.10 | 1.81 | 1 | |
| 12 | −8.17 | 0.85 | 1.757 | 47.71 |
| 13 | −20.72 | 6.78–43.15 | | |

The data for the third embodiment of the present invention are listed in Table 3. In this embodiment, the focal length ranges from 22.6 mm to 62.84 mm, and the F number ranges from 4.6 to 10.84.

TABLE 3

| Surface No. | Radius of Curvature(r) (mm) | Distance(d) (mm) | Refractive Index(nd) | Abbe Number(v) |
|---|---|---|---|---|
| 1 | −13.382 | 0.85 | 1.8061 | 40.73 |
| 2 | 49.415 | 0.53 | 1 | 0 |
| 3 | 21.553 | 4.29 | 1.58913 | 61.25 |
| 4 | −19.463 | 0.1 | 1 | 0 |
| 5 | 43.109 | 2.08 | 1 | 0 |
| 6 | −7.975 | 1.3 | 1.497 | 81.61 |
| 7 | Aperture | 5.73–1.3 | 1 | 0 |
| 8 | −24.228 | 1.82 | 1.58547 | 34.39 |
| 9 | −9.099 | 1.04 | | 0 |

TABLE 3-continued

| Surface No. | Radius of Curvature(r) (mm) | Distance(d) (mm) | Refractive Index(nd) | Abbe Number(v) |
|---|---|---|---|---|
| 10 | −7.355 | 2.34 | 1.834 | 37.34 |
| 11 | −19.446 | 1.77 | | |
| 12 | −8.184 | 0.85 | 1.757 | 47.71 |
| 13 | −20.389 | 6.77–44.05 | 1 | 0 |

Table 4 lists the parameters used in the above embodiments to satisfy the conditions 1 through 3.

TABLE 4

| Parameter | First Embodiment | Second embodiment | Third embodiment |
|---|---|---|---|
| $L_w/f_t$ | 0.49 | 0.475 | 0.47 |
| $f_t/f_w$ | 2.65 | 2.739 | 2.781 |
| m2t | 4.56 | 4.74 | 4.83 |

As described above, the zoom lens system of the present invention uses a smaller number of lenses and can therefore be made compact and short. In addition, the compact zoom lens system has a low aberration for all zoom positions between the wide angle position to the telephoto position, which improves the total quality of the lens system. Moreover, the lenses for the compact zoom lens system are easy to manufacture.

While it has been shown and described what are at present considered the preferred embodiments of the invention, it will be obvious to those skilled in the art that various changes and modifications can by readily incorporated therein without departing from the scope and sprit of the invention which is defined in the appended claims.

What is claimed is:

1. A compact zoom lens system for imaging an object in an image plane, the lens system, when viewed from the object, comprising:

a first lens group with a positive refractive power; and a second lens group with a negative refractive power;

wherein the magnification of the lens system is changed from a wide angle position to a telephoto position by moving the first lens group and the second lens group jointly along the optical axis of the lens system towards the object, wherein $0.45 < L_w/f_t < 0.55$, $2.5 < f_t/f_w(\phi m) < 3.0$, $4.3 < m2t < 5$, wherein $L_w$ is the distance between a front surface of the lens which is closest to the object, of the first lens group, and the image plane in the wide angle position, $f_t$ is the focal length of the compact zoom lens system in the telephoto position, $f_w$ is the focal length of the compact zoom lens system in the wide angle position, φm is the zoom ratio, and m2t is the magnification of the second lens group in the telephoto position.

2. The compact zoom lens system of claim 1, wherein the first lens group comprises a lens having a concave surface facing the object and a negative refractive power, and at least one lens having a convex surface facing the object and a positive refractive power.

3. The compact zoom lens group of claim 1, wherein the first lens group comprises a first lens having a concave surface facing the object and a negative refractive power;

a second lens which is biconvex and has a positive refractive power; and a third lens having a convex surface facing the image plane and a positive refractive power.

4. The compact zoom lens group of claim 3, wherein the first lens group has an aperture located proximate to the image plane side of the third lens of the first lens group.

5. The compact zoom lens group of claim 1, wherein the second lens group comprises a fourth lens having a convex surface facing the image plane and a positive refractive power;

a fifth lens having a concave surface facing the object and a negative refractive power; and a sixth lens having a concave surface facing the object and a negative refractive power.

6. The compact zoom lens group of claim 5, wherein the fifth lens and the sixth lens are meniscus lenses.

* * * * *